United States Patent
Handshaw et al.

(10) Patent No.: US 10,521,628 B2
(45) Date of Patent: Dec. 31, 2019

(54) BARCODE SCANNER WITH PCB

(71) Applicant: SYMBOL TECHNOLOGIES, LLC, Lincolnshire, IL (US)

(72) Inventors: Darran Michael Handshaw, Sound Beach, NY (US); Edward Barkan, Miller Place, NY (US); Mark Drzymala, Saint James, NY (US)

(73) Assignee: Symbol Technologies, LLC, Holtsville, NY (US)

(*) Notice: Subject to any disclaimer, the term of this patent is extended or adjusted under 35 U.S.C. 154(b) by 0 days.

(21) Appl. No.: 15/821,059

(22) Filed: Nov. 22, 2017

(65) Prior Publication Data
US 2019/0156085 A1    May 23, 2019

(51) Int. Cl.
*G06K 7/10*    (2006.01)

(52) U.S. Cl.
CPC ..... *G06K 7/10722* (2013.01); *G06K 7/10881* (2013.01)

(58) Field of Classification Search
CPC .................................................. G06K 7/10881
USPC .................................................... 235/462.41
See application file for complete search history.

(56) References Cited

U.S. PATENT DOCUMENTS

| | | | | |
|---|---|---|---|---|
| 6,648,228 B2* | 11/2003 | Dvorkis | ............. | G06K 7/10633 235/462.43 |
| 2002/0148901 A1 | 10/2002 | Barkan et al. | | |
| 2006/0146171 A1* | 7/2006 | Barkan | ................... | H04N 1/107 348/340 |
| 2017/0310856 A1* | 10/2017 | Handshaw | ........... | G03B 11/045 |

FOREIGN PATENT DOCUMENTS

EP    0944017 A2    9/1999

OTHER PUBLICATIONS

Combined Search and Examination Report for GB Patent Application No. 1817816.0 dated Apr. 4, 2019.

* cited by examiner

*Primary Examiner* — Toan C Ly
(74) *Attorney, Agent, or Firm* — Yuri Astvatsaturov

(57) ABSTRACT

A barcode scanning apparatus that includes a single printed circuit board (PCB) is disclosed. The apparatus includes a housing having a head portion and a handle portion. The handle portion extends generally along a handle axis. The single PCB extends along a PCB plane and is positioned at least partially within the housing. The apparatus includes an image sensor having a plurality of photo-sensitive elements that form a substantially flat surface. The single PCB may have a first portion and a second portion, where the image sensor is positioned on the first portion and is further positioned to capture light entering the housing through a window of the head portion. The apparatus includes a frame positioned at least partially within the housing, where the frame includes an oblique angle formed between a front portion and a rear portion, where the PCB is secured by or to the frame's rear portion.

25 Claims, 7 Drawing Sheets

BARCODE SCANNER WITH PCB

BACKGROUND OF THE INVENTION

Handheld barcode scanners are electronic devices used to read, or scan, barcodes and/or other information from packages or other items. Handheld barcode scanners may be used in retail, factory, or other environments by employees, contractors, personnel or other such users to scan barcodes or other information from retail packages or other items, and may be used in applications ranging from retail sales, inventory management, shipping and tracking, and for a variety of other applications. The design, manufacture, and/or costs associated with the handheld barcode scanners can create problems inefficiencies. This is because, in order to design and manufacture typical handheld scanners, such scanners can require additional hardware or features, such as multiple printed circuit boards (PCBs) to accommodate the handheld design. For example, the additional hardware or features can result in increased complexity and time to design and build the handheld scanner. The complex design may also increase the cost to manufacture and assemble the scanner. For example, in typical designs, handheld barcode scanners include multiple components, such as PCBs, various connectors, cables or ribbons, and various other interconnections that may be required for the multiple components to work together in order to implement the scanning and imaging functionality of the handheld scanner. These types of complex designs typically result in increased manufacturing and assembly costs to produce the handheld barcode scanner, because of the per-unit cost of each of the multiple components (e.g., multiple PCBs, connectors, etc.) that make up the handheld barcode scanner, and because of the labor costs associated with assembling such multiple components to produce the barcode scanner.

Another concern becomes particularly evident when the practical aspects of scanner-housing manufacturing processes are taken into consideration. It is common to manufacture scanner housings via plastic molding techniques that require handle portions to be slid off a mold along a discharge axis, especially in cases of unitary/monocoque construction. This results in difficulties in terms of providing structural support for scanner's internal components when those components are angled relative to the discharge axis.

Accordingly, there is a need for solutions that decrease the design complexity and costs associated with the make and manufacture of handheld barcode scanners, and further for making these improvements in combination with maintaining or increasing robustness.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
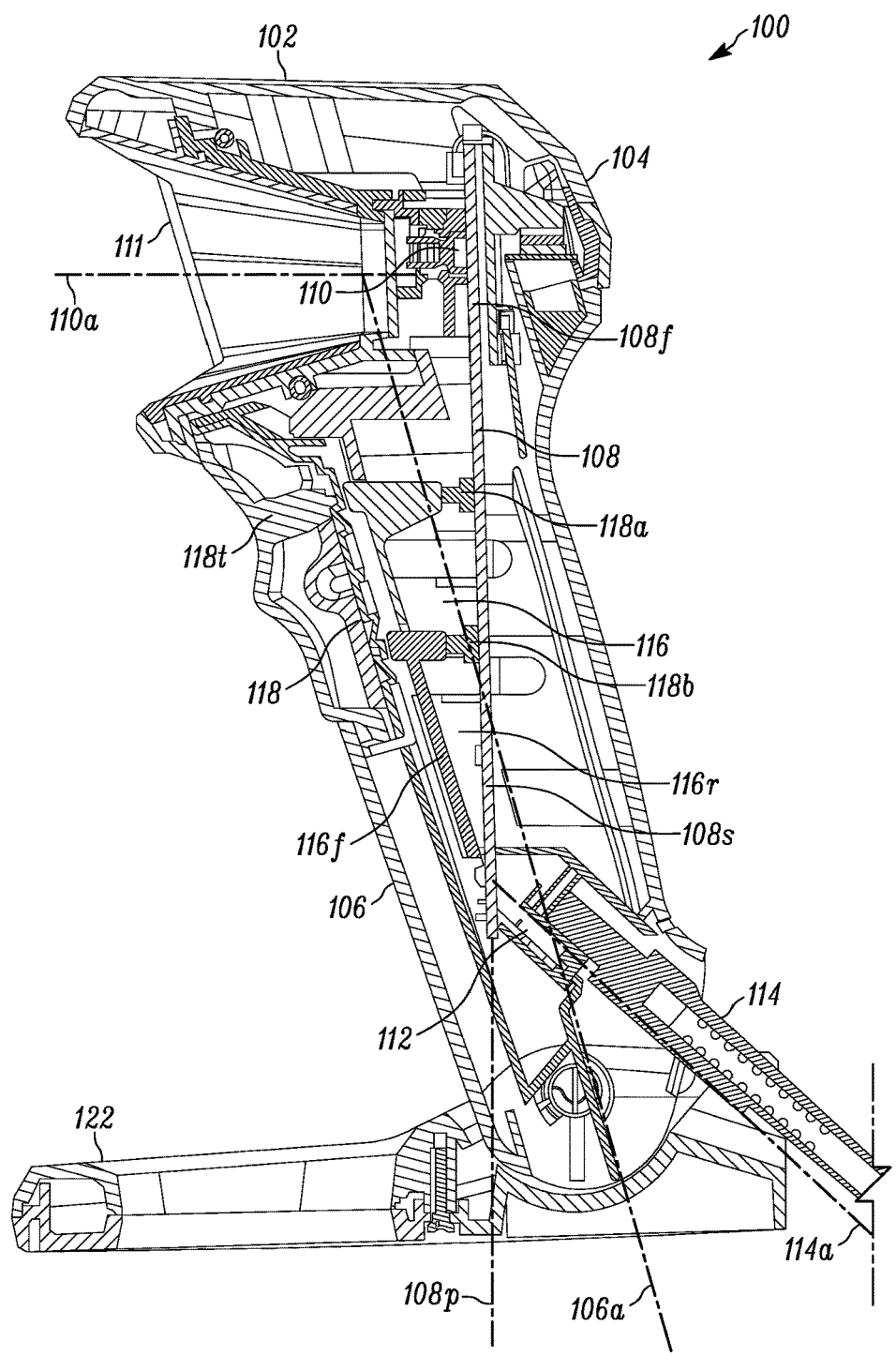
FIG. 1 illustrates a cross-section view of an example scanner in accordance with various embodiments disclosed herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In various embodiments of the present disclosure, a single PCB design is described for ergonomic handheld scanners. The single PCB design allows for decreased design complexity and, therefore, decreased manufacture and assembly costs where, for example, fewer parts may be used in the overall production of an ergonomic handheld scanner.

For example, in various embodiments, it may be important for the imaging optics of a scanner to be perpendicular to an imaging axis. In the single PCB design, instead of using mounting features in the tooling direction of an ergonomic handle, a frame may be used, where a single PCB may attach to the frame in order to orient the PCB, and therefore its related imaging sensor as described herein, perpendicular to the imaging axis of the scanner. The frame may have features operable to orient and mount the frame within the scanner's handle at an ergonomic angle. Accordingly, the single PCB design as described herein may allow for decreased manufacturing and assembly costs, and may also allow for the overall design of the barcode scanner to house a larger PCB, and, thereby, provide a larger surface area for incorporating the electronics and imaging optics mountable on the single PCB. For example, a main connector for the scanner (e.g., the power, data, and/or battery connector) may be mounted on the same PCB as the imaging optics. This eliminates the need for additional PCBs and interconnects with other, separate PCBs within the scanner.

The single PCB design may also allow the barcode scanner to incorporate a more deeply recessed imaging optics engine (e.g., image sensor(s) and related processors or circuitry) within the scanner. This more deeply recessed design may provide additional protection to the imaging optics engine, for example, from scratches, smudges, and may also increase the read accuracy of the imaging optics engine, for example, as caused by stray light that would otherwise interfere with the imaging sensors.

Accordingly, in various embodiments herein, a barcode scanner having an imaging field of view (FOV) defined by an imaging FOV axis is disclosed. The barcode scanner may include a housing, where the housing includes a head portion and a handle portion. The handle portion may extend generally along a handle axis. The barcode scanner may also include a printed circuit board (PCB) positioned at least partially within the housing and extending along a PCB plane. The PCB may be rigid and may further include a first portion and a second portion.

The barcode scanner may further include an image sensor positioned on the first portion of the PCB, where the image sensor includes a plurality of photo-sensitive elements arranged in a pattern and forming a substantially flat surface. The image sensor may include an imaging axis that is normal to the substantially flat surface of the image sensor, where the imaging axis further is coaxial with the imaging FOV axis.

The barcode scanner may further include a connector positioned on the second portion of the PCB, where the connector is configured to connect with an external component. For example, the external component may be at least one of a power component or a data component.

In still further embodiments herein, a barcode scanning apparatus that includes a single PCB is disclosed. The apparatus may include a housing, where the housing has a head portion and a handle portion. In some embodiments, the head portion may include a window and the handle portion may extend generally along a handle axis.

In certain embodiments, the apparatus may further include a single PCB positioned at least partially within the housing. The single PCB may extend along a PCB plane. In some embodiments the angle between the handle axis and the PCB plane is between 10 degrees and 20 degrees.

In some embodiments, the PCB may have a first portion and a second portion.

In some embodiments, the apparatus may further include an image sensor. The image sensor may include a plurality of photo-sensitive elements that form a substantially flat surface. The substantially flat surface may be parallel with the PCB plane. In some aspects, the image sensor may be positioned on the first portion of the PCB, where the image sensor is positioned to capture light entering the housing through the window.

In some embodiments, the apparatus may include a connector positioned on the second portion of the PCB, where the connector is configured to connect with an external component. In certain aspects, the external component can include at least one of a data component or a power component. In some embodiments an angle between a connection axis of the external component and the PCB plane may be between 30 degrees and 60 degrees.

In certain embodiments, the apparatus may further include a frame positioned at least partially within the housing. In certain aspects, the frame may include a front portion and a rear portion. In still further aspects, there an oblique angle may be formed between the front portion and the rear portion. In other embodiments, the PCB may be secured by and/or secured to the rear portion of the frame.

In some embodiments, the apparatus may include a trigger assembly positioned at least partially within the housing. The trigger assembly may be further positioned adjacent to the front portion of the frame. In certain aspects, the trigger assembly may include a trigger. The trigger may be moveable relative to the housing, such that a front-to-back movement of the trigger is translated to an actuator on the PCB via a linkage moveable in an arc.

In additional embodiments, the apparatus may include a foot that is capable of receiving at least a part of the handle portion.

In some embodiments, the present disclosure is directed to a method of manufacturing a barcode scanner having a housing. The method includes: molding a handle portion via a mold, the operation of molding configured to provide a cavity inside the handle portion and at least one support rib, each of the at least one support rib extending along a support rib axis; separating the mold and the handle portion along a discharge axis, the support rib axis and the discharge axis being parallel; inserting, at least partially, a printed circuit board (PCB) into the handle portion along an insertion axis such that the at least one support rib contacts at least one of a front surface of the PCB and a rear surface of the PCB, the insertion axis having an oblique angle relative to the support rib axis; and attaching a head portion to a top of the handle portion.

Figure 2:
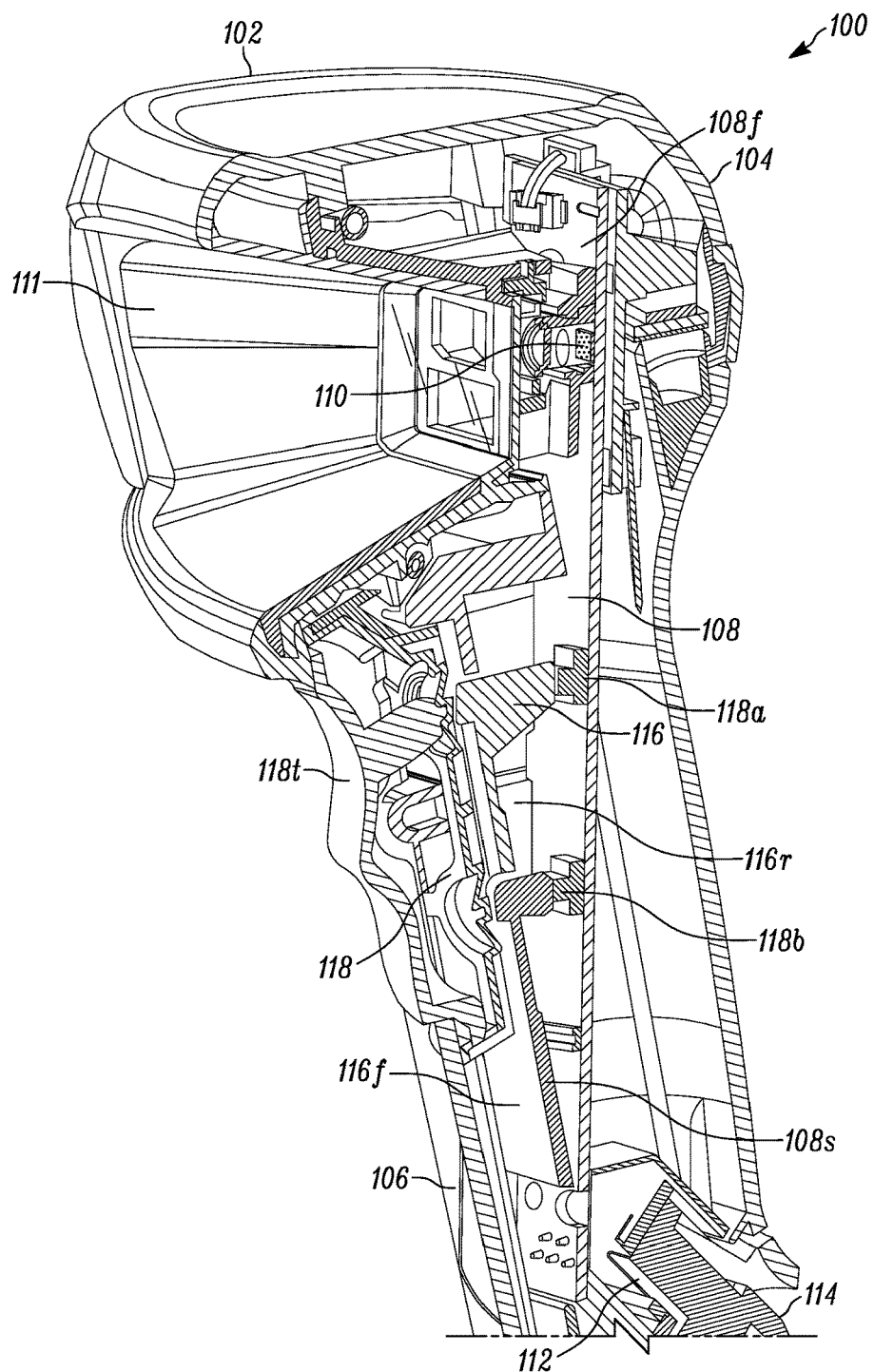
FIG. 2 illustrates a perspective cross section view of the example scanner of FIG. 1 in accordance with various embodiments disclosed herein.

FIG. 1 illustrates a cross-section view of an example scanner 100 in accordance with various embodiments disclosed herein. FIG. 2 illustrates a perspective cross section view of the example scanner 100 of FIG. 1. In various embodiments, scanner 100 may be a barcode scanner, scanning device, or barcode scanning apparatus, as described herein. The scanner 100 may include housing 102. Housing 102 may include a head portion 104. The head portion 104 may include an imaging field of view (FOV) 302 defined by an imaging FOV axis 310a as described for FIG. 3 herein. For example, scanner 100 may include the imaging FOV 302 defined by imaging FOV axis 310a, where the imaging FOV axis 310a is coaxial with imaging axis 110a that extends through window 111 of scanner 100.

Housing 102 may also include a handle portion 106 that extends generally along a handle axis 106a. In some embodiments, an angle (e.g., the acute angle) between the handle axis 106a and the imaging FOV axis 310a/imaging axis 110a may be between 60 degrees and 80 degrees. In other embodiments, the angle (e.g., the acute angle) between the handle axis 106a and the imaging FOV axis 310a/imaging axis 110a may be between 70 degrees and 80 degrees.

In some embodiments, scanner 100 may include a PCB 108 positioned at least partially within housing 102 and that extends along a PCB plane 108p. In certain embodiments, the angle (e.g., an acute angle) between the handle axis 106a and the PCB plane 108p may be between 10 degrees and 20 degrees.

In various embodiments, the PCB 108 may be rigid and includes a first portion 108f and a second portion 108s. In an embodiment, for example, the first portion 108f may be a top half of the PCB 108, and the second portion 108s may be a bottom half of the PCB 108. In various embodiments, the PCB 108 may be made of a fiberglass, plastic, or other non-conductive material board and may include a circuit or circuits of conductive material (e.g., copper) etched into the non-conductive material board. The circuit(s) of the PCB 108 supply and transmit power and data for controlling and operating the various electronic components of scanner 100 (e.g., image sensor 110, connector 112, etc.), e.g., to actuate and provide the scanner 100's barcode scanning functionality.

In various embodiments, the scanner 100 may include an image sensor 110 that may be positioned on the first portion 108f of the PCB 108. In some embodiments, the image sensor 110 may include a plurality of photo-sensitive elements 110e, where the photo-sensitive elements 110e may be arranged in a pattern and may form a substantially flat surface. For example, the photo-sensitive elements 110e may be arranged in a grid or a series of arrays forming a 2D surface. In some embodiments, the substantially flat surface of the plurality of photo-sensitive elements 110e may be parallel with the PCB plane 108p.

Figure 3:
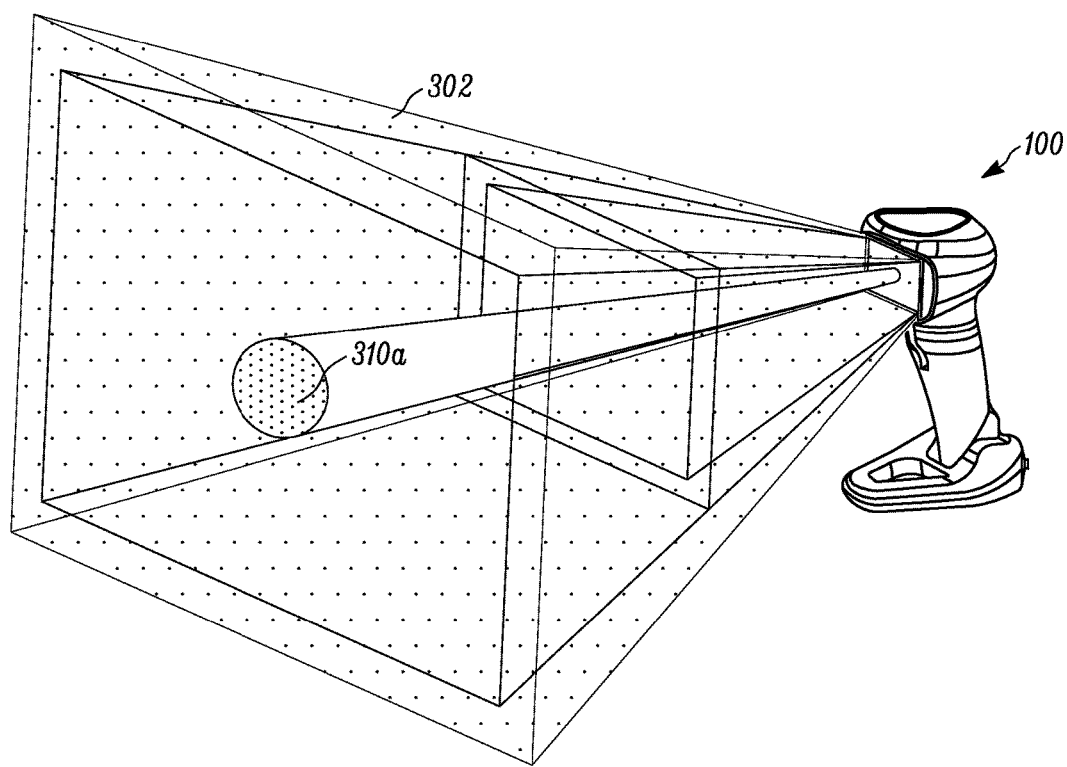
FIG. 3 illustrates a perspective view of an example Field of View (FOV) and FOV axis for the example scanner of FIG. 1 in accordance with various embodiments disclosed herein.

In some embodiments, image sensor 110 may include imaging axis 110a that is at a normal angle to the substantially flat surface formed by the photo-sensitive elements 110e of the image sensor 110. In certain embodiments, the imaging axis 110a may be coaxial with an imaging FOV axis (e.g., FOV axis 310a as depicted in FIG. 3) and may extend through window 111. As described herein, and depicted in FIGS. 1 and 2, the embodiment of scanner 100 includes the single PCB 108 with image sensor 110, where the image sensor 110 is attached to the single PCB 108 such that the imaging axis 110a of the image sensor 110 extends through the window 111 for the purpose of capturing 2D images (e.g., barcodes).

In other embodiments, the scanner 100 may include a connector 112 that may be positioned on the second portion 108s of the PCB 108. The connector 112 may be configured to connect with an external component 114 such as a power component and/or a data component. For example, the external component 114 may be a battery, a transceiver, or a cable. In some embodiments, the angle (e.g., the acute angle) between a connection axis 114a of the external component 114 and the PCB plane 108p may be between 30 degrees and 60 degrees.

In various embodiments, a cable (as shown in FIG. 1) may be attached as the external component 114, where the cable is connected to a single interface on the PCB 108. The cable may be capable of supplying and transmitting power and/or data to PCB 108 and/or the scanner 100. For example, the external component 114 may be a data and power cable; e.g., RJ45-connectorized cable, which may be attached to Point of Sale (PoS) terminal or other terminal or station and used, e.g., for sending and receiving data (e.g., barcode data) and/or power from the terminal or station, and the scanner 100. In other examples, the external component 114 may be a battery (e.g., a Lithium Ion battery) that supplies power to the scanner 100, and where the battery slides into the handle portion 106. In still further examples, the external component 114 may include a wireless transceiver that uses a wireless transmission standard (e.g., the Bluetooth standard) in order to transmit and receive data signals (e.g., barcode data) to and from a PoS terminal or other terminal or station.

As shown in FIGS. 1 and 2, for some embodiments, the scanner 100 may further include a frame 116 positioned at least partially within the housing 102. The frame 116 may include a front portion 116f and a rear portion 116r, where an oblique angle may be formed between the front portion 116f and the rear portion 116r. In some embodiments, the PCB 108 may be secured by and/or secured to the rear portion 116r, such as secured by and/or secured to the rear portion 116r via snaps, stakes, bolts, or screws. As shown in FIGS. 1 and 2, the frame 116 allows the PCB 108 to be oriented perpendicular to the imaging axis 110a, while at the same time allowing the ergonomic handle to maintain its angle. In some embodiments, during assembly of the scanner 100, the frame 116 may be slid into the housing 102 with the PCB 108 and related components (e.g., the image sensor 110) already attached, which may simplify manufacture and assembly of the scanner 100 as described herein.

In some embodiments, the scanner 100 may further include a trigger assembly 118 positioned at least partially within the housing 102. The trigger assembly 118 may be further positioned adjacent to the front portion 116f of the frame 116. In certain embodiments, the trigger assembly 118 may include a trigger 118t, where the trigger 118t may be moveable relative to the housing 102. For example, such motion may include a front-to-back movement of the trigger 118t, where the motion is translated to actuator 118a and/or actuator 118b on the PCB 108 via a linkage moveable in an arc.

As shown in FIG. 1, in further embodiments, the scanner 100 may further include a foot 122. The foot 122 may be capable of receiving at least a part of the handle portion 106 as depicted in FIG. 1. In some aspects, the scanner 100 with the foot 122 may be referred to as a "pedestal" design or pedestal embodiment for the scanner 100. In the pedestal embodiment, the scanner may sit within the foot 122, and a user may present an object (e.g., a package) to the scanner 100 for scanning, or may lift the scanner 100 off the foot 122 for hand-held use.

FIG. 3 illustrates a perspective view of an example Field of View (FOV) 302 and FOV axis 310a for the example scanner 100 of FIG. 1 in accordance with various embodiments disclosed herein. The FOV 302 of scanner 100 may include an area that the scanner 100 is able to scan such that, e.g., barcodes within FOV 302, and located at a workable distance to scanner 100, are able to be scanned by scanner 100. As depicted in FIG. 3, the FOV axis 310a extends through a central portion of the FOV 302 and defines a general direction of scanning for the scanner 100. In some embodiments, the FOV axis 310a may divide the FOV 302 into two halves. In such embodiments, the FOV 302 may be represented in a V or cone shape, where the edges of the V or cone shape form the boundaries of the FOV 302. In such embodiments, the FOV axis 310a may divide the V or cone shape of the FOV 302 vertically, where two-sides of the V or cone shape have similar angles to one another.

Figure 4:
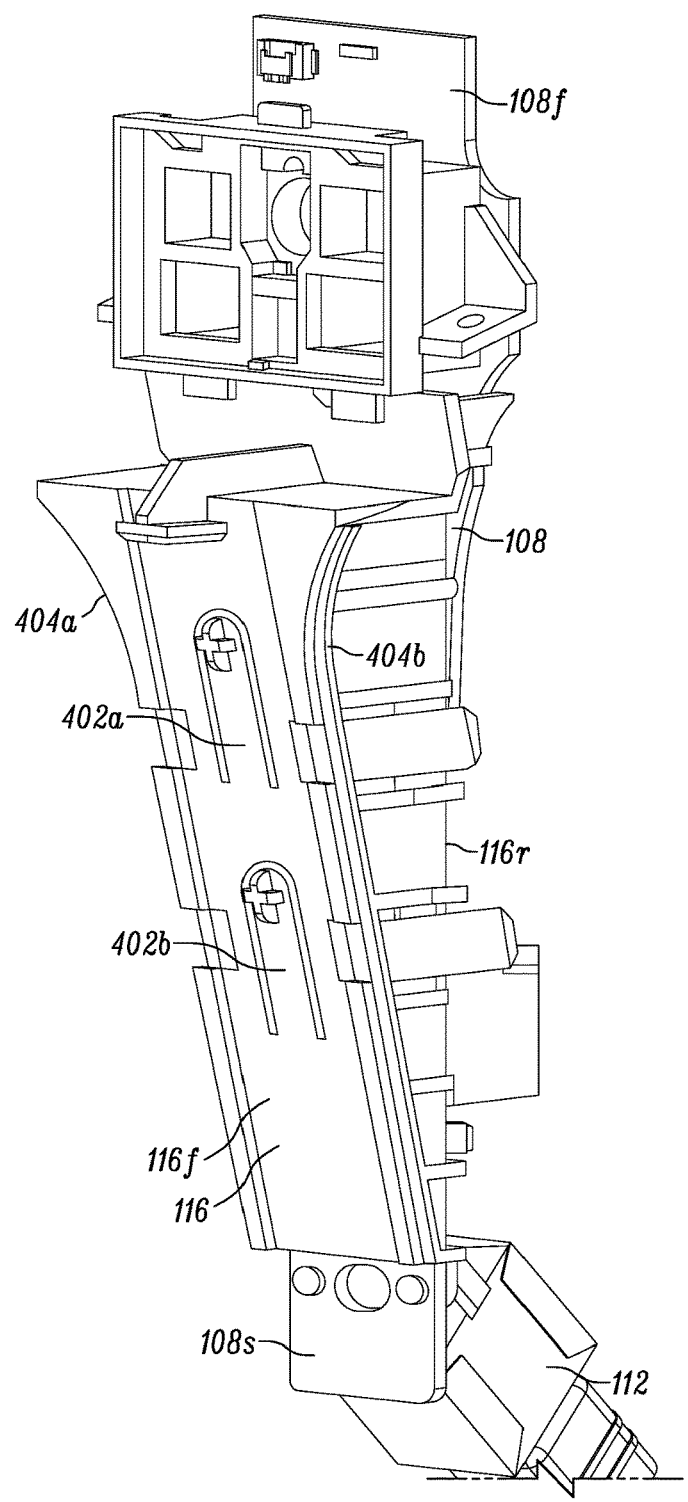
FIG. 4 illustrates a perspective view of an example frame of the example scanner of FIG. 1 in accordance with various embodiments disclosed herein.

FIG. 4 illustrates a perspective view of frame 116 of the example scanner 100 of FIG. 1 in accordance with various embodiments disclosed herein. As depicted in FIG. 4, image sensor 110 may be attached to first portion 108f of PCB 108 and connector 112 may be attached on the second portion 108s of the PCB 108. As shown in FIG. 2, the image sensor 110 may include the plurality of photo-sensitive elements 110e arranged in a pattern and forming a substantially flat surface.

As further depicted in FIG. 4, frame 116 may include flexible tabs 402a and 402b that may each receive the motion from the trigger 118t and transfer that motion to actuators 118a and 118b to activate scanner 100, for example, to initiate scanning barcode(s). Each of the flexible tabs 402a and 402b provide a linkage and include a handle (in this case in a form of a flexible beam) connected to the frame 116 and a head connected to the handle, as depicted in FIG. 4.

Frame 116 may also include a right handle locating rail 404a and a left handle locating rail 404b, where each handle locating rail slides into, or integrates with, two respective ribs formed in housing 102. The handle locating rails 404a and 404b promote simplified assembly of the scanner 100 as described herein.

Figure 5:
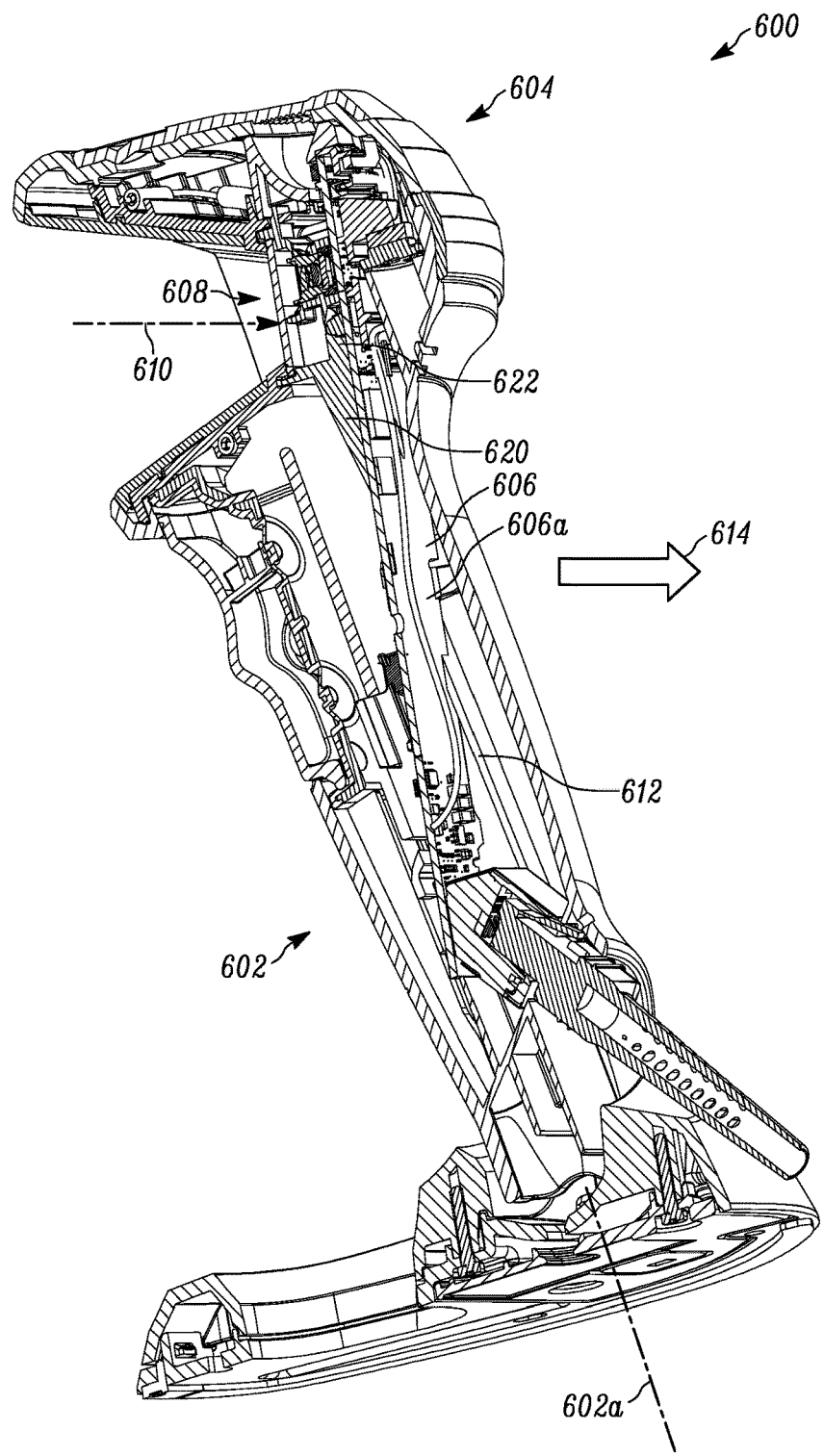
FIG. 5 illustrates a rear perspective cross section view of the example scanner of in accordance with various embodiments disclosed herein.
Figure 6:
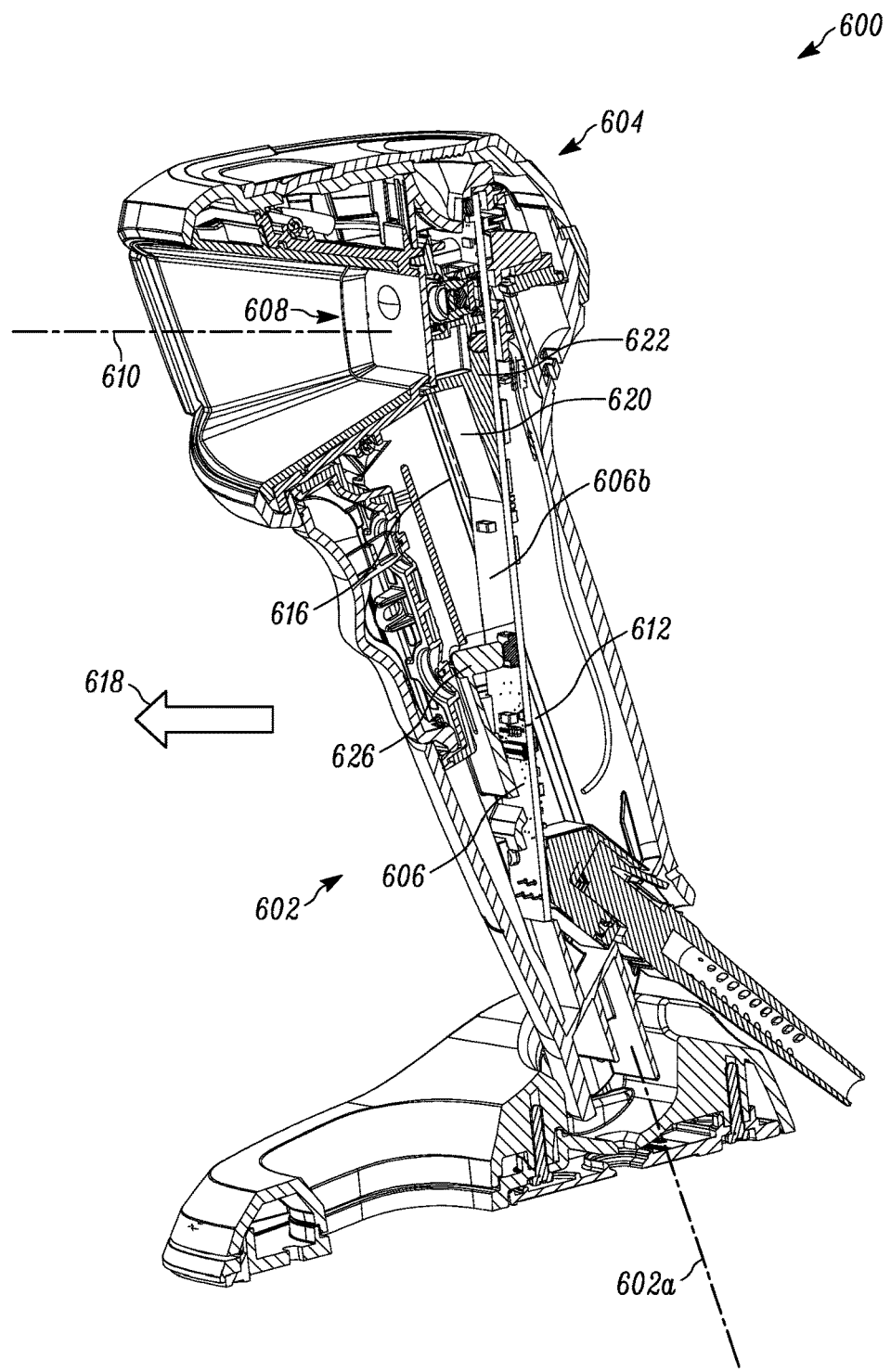
FIG. 6 illustrates a front perspective cross section view of the scanner of FIG. 5.
Figure 7:
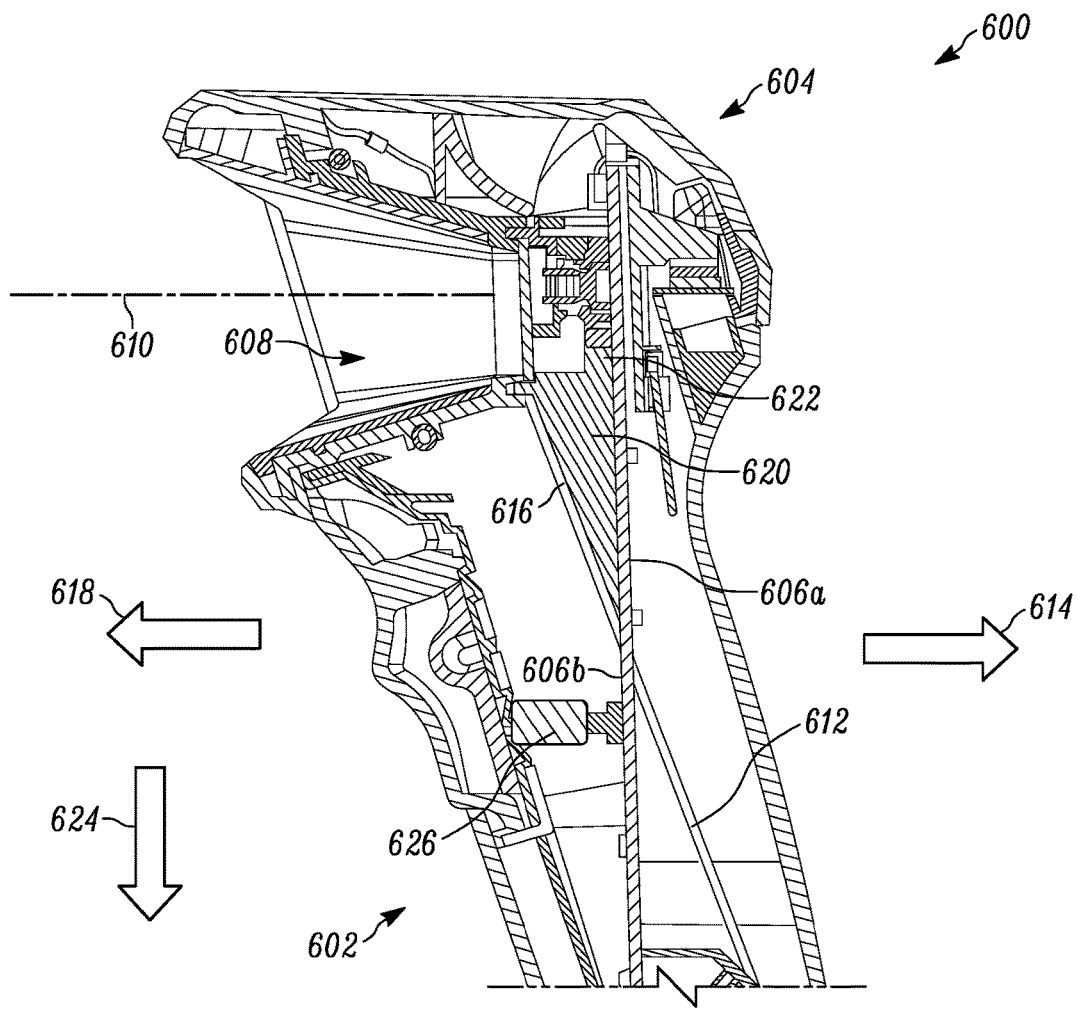
FIG. 7 illustrates a side cross section view of the scanner of FIG. 5.

Referring now to FIGS. 5-7, shown therein is another embodiment of a barcode scanner 600 in accordance with the present disclosure. The scanner 600 includes a handle portion 602 that extends generally along a handle axis 602a and a head portion 604 affixed to the top of the handle portion 602. In an embodiment, the handle axis is defined by a removal/discharge axis of a mold used to form the handle portion 602 (i.e., the axis along with a mold/handle portion is removed after forming the handle portion 602). As in the previously described embodiment, the scanner 600 includes a single PCB 606 with optical componentry 608 that define a FOV with an imaging FOV axis 610. Additionally, the orientation of the PCB 606, optical componentry 608, imaging FOV axis 610, and handle axis 602a, relative to each other, can also be the same as in the previously described embodiment. Accordingly, a repetition of prior features will not be provided, and those of ordinary skill in the art will recognize the similarities.

To help provide added support for the PCB 602 and/or the optical componentry 608, the inside surface of the handle portion 602 includes one or more support structures designed to contact the PCB 606 and/or the optical componentry 608 along at least one point thereof. As best seen in FIGS. 5 and 7, scanner 600 is shown with an exemplary first support structure in a form or a lower support rib 612 that extends parallel to the handle axis 602a. The support rib is shaped to contact the back surface 606a of the PCB 606 such that lateral flexing and/or deflection of the PCB 606 in the rearward direction 614 is prevented and/or restricted. While only one lower rib 612 is illustrated, any desired number of ribs may be provided.

As best seen in FIGS. 6 and 7, scanner 600 is also shown with an exemplary second support structure in a form or an upper support rib 616 that extends parallel to the handle axis 602a. In the currently described embodiment, the upper support rib 616 is collinear with the lower support rib 612, with the lower support rib 612 extending deeper into the internal cavity of the handle portion 602 and away from the internal surface of the handle portion 602 than the upper support rib 616. As shown, the upper support rib 616 is shaped to contact the front surface 606b of the PCB 606 such that lateral flexing and/or deflection of the PCB 606 in the frontward direction 618 is prevented and/or restricted. As shown, the upper support rib 616 is also shaped to contact a front lower surface 620 of an optical chassis 622 which is fixedly attached to the PCB 606. The angled nature of the front lower surface 620 relative to the orientation of the PCB 606 and its support by the upper support rib 616 provides additional support for the PCB 606 and optical chassis 622, and further restrains the movement of those components in both the frontward direction 618 and downward direction 624. While only one upper rib 616 is illustrated, any desired number of ribs may be provided. Additionally, in some embodiments the upper support rib 616 may be configured to support just one of the front surface 606b of the PCB 606 or the front lower surface 620 of the optical chassis 622.

This configuration can be advantageously used in instances where the handle portion 602 is molded in the form of a cylindrical monocoque (the handle portion of the housing is molded as a single piece in the circumferential direction) and is then discharged from the mold in the downwardly direction or the mold removed in the upwardly direction relative to the orientation of the handle portion 602 as shown in FIGS. 5-7. Moreover, while the trigger mechanism would require some modification to establish contact with the PCB 606 (e.g., trigger extensions 626), the added support of the PCB 606 may allow for an easier implementation of a scanner embodiment which avoids the use of the frame 116 of embodiment shown in FIGS. 1-4. This can lead to further benefits in reduced cost, complexity, and/or reliability. However, the two configurations are not mutually exclusive, and if desired, the use of support structures, as shown in the scanner 600, can be combined with the frame 116.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A barcode scanner having an imaging field of view (FOV) defined by an imaging FOV axis, the barcode scanner comprising:
    a housing, the housing including a head portion and a handle portion, the handle portion extending generally along a handle axis;
    a printed circuit board (PCB) positioned at least partially within the housing and extending along a PCB plane, the PCB being rigid and further having a first portion and a second portion;
    an image sensor positioned on the first portion of the PCB, the image sensor having a plurality of photo-sensitive elements arranged in a pattern and forming a substantially flat surface, the image sensor further having an imaging axis, the imaging axis being normal to the substantially flat surface of the image sensor, the imaging axis further being coaxial with the imaging FOV axis; and
    a connector positioned on the second portion of the PCB, the connector configured to connect with an external component, the external component being at least one of a power component or a data component,
    wherein the handle portion includes a first support rib extending along a first support rib axis, the first support rib shaped to contact one of a front surface of the PCB and a rear surface of the PCB, the first support rib axis being parallel with the handle axis.

2. The barcode scanner of claim 1, wherein the handle portion is a cylindrical monocoque.

3. The barcode scanner of claim 1, wherein an angle between the first support rib axis and the imaging FOV axis is between 60 degrees and 80 degrees.

4. The barcode scanner of claim 1, further comprising:
    a chassis attached to the PCB,
    wherein the first support rib is a lower support rib and wherein the first support rib axis is a lower support rib axis,
    wherein the handle portion further includes an upper support rib extending along an upper support rib, the upper support rib axis being parallel with the handle axis,
    wherein the lower support rib is shaped to contact the rear surface of the PCB, restraining movement of the PCB in a rearward direction, and
    wherein the upper support rib is shaped to contact at least one of the front surface of the PCB and a portion of the chassis, restraining movement of the of the PCB in at least one of a frontward direction and a downward direction.

5. The barcode scanner of claim 4, wherein the upper support rib and the lower support rib are collinear.

6. The barcode scanner of claim 4, wherein the handle portion defines an internal cavity, and wherein the lower support rib extends deeper into the cavity than the upper support rib.

7. The barcode scanner of claim 1, wherein the substantially flat surface is parallel with the PCB plane.

8. The barcode scanner of claim 1, wherein an angle between a connection axis of the external component and the PCB plane is between 30 degrees and 60 degrees.

9. The barcode scanner of claim 1, further comprising a frame positioned at least partially within the housing, the frame including a front portion and a rear portion, there being an oblique angle between the front portion and the rear portion, the PCB being at least one of secured by or secured to the rear portion.

10. The barcode scanner of claim 9, further comprising a trigger assembly positioned at least partially within the housing, the trigger assembly being further positioned adjacent to the front portion of the frame.

11. The barcode scanner of claim 10, wherein the trigger assembly includes a trigger, the trigger being moveable relative to the housing, and wherein a front-to-back movement of the trigger is translated to an actuator on the PCB via a linkage moveable in an arc.

12. The barcode scanner of claim 11, wherein the linkage includes a flexible beam connected to the frame and a head connected to the flexible beam.

13. The barcode scanner of claim 9, wherein the frame includes at least one locating rail and the housing includes at least one locating rail rib, the at least one locating rail capable of being integrated with a respective one of the at least one locating rail rib.

14. An apparatus comprising:
    a housing, the housing including a head portion and a handle portion, the head portion including a window, the handle portion extending generally along a handle axis;
    a printed circuit board (PCB) positioned at least partially within the housing and extending along a PCB plane, the PCB having a first portion and a second portion;
    an image sensor having a plurality of photo-sensitive elements forming a substantially flat surface, the image sensor being positioned on the first portion of the PCB, the image sensor being further positioned to capture light entering the housing through the window; and a frame positioned at least partially within the housing, the frame including a front portion and a rear portion, there being an oblique angle between the front portion and the rear portion, the PCB being at least one of secured by and secured to the rear portion.

15. The apparatus of claim 14, further comprising a trigger assembly positioned at least partially within the housing, the trigger assembly being further positioned adjacent to the front portion of the frame.

16. The apparatus of claim 14, wherein the trigger assembly includes a trigger, the trigger being moveable relative to the housing, and wherein a front-to-back movement of the trigger is translated to an actuator on the PCB via a linkage moveable in an arc.

17. The apparatus of claim 14, wherein the substantially flat surface is parallel with the PCB plane.

18. The apparatus of claim 14, further comprising a connector positioned on the second portion of the PCB, the connector configured to connect with an external component, the external component being at least one of a data component or a power component.

19. The apparatus of claim 14, wherein an angle between the handle axis and the PCB plane is between 10 degrees and 20 degrees.

20. The apparatus of claim 14, wherein the frame includes at least one locating rail and the housing includes at least one rib, the locating rail capable of being integrated with the rib.

21. A method of manufacturing a barcode scanner having a housing, the method comprising:
    molding a handle portion via a mold, the operation of molding configured to provide a cavity inside the handle portion and at least one support rib, each of the at least one support rib extending along a support rib axis;
    separating the mold and the handle portion along a discharge axis, the support rib axis and the discharge axis being parallel;
    inserting, at least partially, a printed circuit board (PCB) into the handle portion along an insertion axis such that the at least one support rib contacts at least one of a front surface of the PCB and a rear surface of the PCB, the insertion axis having an oblique angle relative to the support rib axis; and
    attaching a head portion to a top of the handle portion.

22. The method of claim 21, further comprising:
    securing a chassis to the PCB, the chassis housing at least some optical components,
    wherein the at least one support rib includes at least one upper support rib, and
    wherein the operation of inserting the PCB into the handle portion causes a portion of the chassis to be abutted against the at least one upper support rib.

23. A barcode scanner having an imaging field of view (FOV) defined by an imaging FOV axis, the barcode scanner comprising:
    a housing, the housing including a head portion and a handle portion, the handle portion extending generally along a handle axis;
    a printed circuit board (PCB) positioned at least partially within the housing and extending along a PCB plane, the PCB being rigid and further having a first portion and a second portion;
    a chassis attached to the PCB;
    an image sensor positioned on the first portion of the PCB, the image sensor having a plurality of photo-sensitive elements arranged in a pattern and forming a substantially flat surface, the image sensor further having an imaging axis, the imaging axis being normal to the substantially flat surface of the image sensor, the imaging axis further being coaxial with the imaging FOV axis; and
    a connector positioned on the second portion of the PCB, the connector configured to connect with an external component, the external component being at least one of a power component or a data component,
    wherein the handle portion includes an upper support rib extending along an upper support rib axis and a lower support rib extending along a lower support rib axis, the each of the upper support rib axis and the lower support rib axis being parallel with the handle axis,
    wherein the lower support rib is shaped to contact a rear surface of the PCB, restraining movement of the PCB in a rearward direction, and
    wherein the upper support rib is shaped to contact at least one of a front surface of the PCB and a portion of the chassis, restraining movement of the of the PCB in at least one of a frontward direction and a downward direction.

24. A barcode scanner having an imaging field of view (FOV) defined by an imaging FOV axis, the barcode scanner comprising:
    a housing, the housing including a head portion and a handle portion, the handle portion extending generally along a handle axis;
    a printed circuit board (PCB) positioned at least partially within the housing and extending along a PCB plane, the PCB being rigid and further having a first portion and a second portion;
    a frame positioned at least partially within the housing, the frame including a front portion and a rear portion, there being an oblique angle between the front portion and the rear portion, the PCB being at least one of secured by or secured to the rear portion;
    an image sensor positioned on the first portion of the PCB, the image sensor having a plurality of photo-sensitive elements arranged in a pattern and forming a substantially flat surface, the image sensor further having an imaging axis, the imaging axis being normal to the substantially flat surface of the image sensor, the imaging axis further being coaxial with the imaging FOV axis; and
    a connector positioned on the second portion of the PCB, the connector configured to connect with an external component, the external component being at least one of a power component or a data component.

25. The barcode scanner of claim 24, wherein the frame includes at least one locating rail and the housing includes at least one rib, the at least one locating rail capable of being integrated with a respective one of the at least one locating rail rib.

* * * * *